(12) United States Patent
Nakagawa (10) Patent No.: US 8,823,980 B2
(45) Date of Patent: Sep. 2, 2014

(54) PRINTING SYSTEM, IMAGE FORMING APPARATUS, DATA GENERATION APPARATUS, STORAGE APPARATUS, AND CONTROL METHOD

(75) Inventor: Isamu Nakagawa, London (GB)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 13/084,787

(22) Filed: Apr. 12, 2011

(65) Prior Publication Data

US 2011/0292442 A1 Dec. 1, 2011

(30) Foreign Application Priority Data

May 28, 2010 (JP) .................................. 2010-123301

(51) Int. Cl.
- G03F 3/10 (2006.01)
- G06F 3/12 (2006.01)
- G06F 17/00 (2006.01)
- B41L 19/00 (2006.01)
- B41F 1/54 (2006.01)

(52) U.S. Cl.
USPC .......... 358/1.15; 358/527; 358/1.13; 358/1.9; 358/1.18; 715/274; 707/999; 101/45; 101/484; 101/485

(58) Field of Classification Search
USPC .......... 358/1.9, 527, 1.15, 1.13; 1/1; 715/738
See application file for complete search history.

(56) References Cited

U.S. PATENT DOCUMENTS

| | | | |
|---|---|---|---|
| 7,619,764 B2 * | 11/2009 | Fukunaga et al. | 358/1.15 |
| 8,276,068 B2 * | 9/2012 | Toda | 715/274 |
| 2002/0026453 A1 * | 2/2002 | Mori et al. | 707/104.1 |
| 2002/0048036 A1 * | 4/2002 | Nakagawa et al. | 358/1.14 |
| 2002/0085224 A1 * | 7/2002 | Price et al. | 358/1.13 |
| 2003/0051615 A1 * | 3/2003 | Denoue et al. | 101/45 |
| 2003/0103221 A1 * | 6/2003 | Natori | 358/1.9 |
| 2005/0213152 A1 * | 9/2005 | Suzuki et al. | 358/1.15 |
| 2005/0286100 A1 * | 12/2005 | Uotani et al. | 358/527 |
| 2007/0211296 A1 * | 9/2007 | Toda | 358/1.18 |
| 2007/0263260 A1 | 11/2007 | Ohta | |
| 2009/0237725 A1 * | 9/2009 | Hamaguchi | 358/1.15 |

FOREIGN PATENT DOCUMENTS

| | | |
|---|---|---|
| CN | 1841309 A | 10/2006 |
| CN | 1936822 A | 3/2007 |
| CN | 1972350 A | 5/2007 |
| CN | 101114211 A | 1/2008 |
| EP | 1 874 025 A2 | 1/2008 |
| JP | 2002-149371 | 5/2002 |
| JP | 2007125813 A | 5/2007 |
| JP | 2007304761 A | 11/2007 |

* cited by examiner

Primary Examiner — Akwasi M Sarpong
(74) Attorney, Agent, or Firm — Fitzpatrick, Cella, Harper & Scinto (57) ABSTRACT

An image forming apparatus which configures a printing system includes an application server which has a function of editing and storing document data, and provides the document data in response to a request; the image forming apparatus having a plurality of functions including a printing function; a data generation apparatus which generates, from the document data, print data printable by the image forming apparatus; and a storage apparatus which stores data having undergone processing by the image forming apparatus, the apparatuses being communicable with each other via a network, comprising: recording unit configured to record, as difference data, a setting difference upon setting change of print data; and transmission unit configured to execute processing for the print data, and transmitting a completion notification of the processing together with the difference data.

7 Claims, 10 Drawing Sheets

PRINT SETTINGS — 610

| | | |
|---|---|---|
| COLOR : | MONOCHROME ▽ | ~611 |
| LAYOUT : | 4 in 1 ▽ | ~612 |
| COPY-FORGERY-INHIBITED PATTERN : | COPY PROTECTED ▽ | ~613 |
| PAGE NUMBER : | PRINT ▽ | ~614 |

[STORE] ~615   [CLOSE] ~616

FIG. 6D

WATERMARK SETTINGS — 617

| | | |
|---|---|---|
| PRINTING DATE & TIME : | EMBED ▽ | ~618 |
| PRINTING USER : | NOT EMBED ▽ | ~619 |
| DEVICE NUMBER : | EMBED ▽ | ~620 |
| DOCUMENT URL : | NOT EMBED ▽ | ~621 |
| DATA ID : | EMBED ▽ | ~622 |

[STORE] ~623   [CLOSE] ~624

F I G. 10

| ITEM | EXAMPLE |
|---|---|
| DATA ID | 475d4d07-011a-1000-b3f3-00e000c4ae6f |
| JOB TYPE | PRINT |
| JOB ID | 500 |
| STATUS | NORMAL END |
| START TIME | 2008/09/16 10:04:22 |
| END TIME | 2008/09/16 10:06:32 |
| USER ID | 1000 |
| DOCUMENT NAME | abc |
| LOGICAL SURFACE COUNT | 12 |
| PAPER SIZE | A4 |
| DISCHARGE SHEET COUNT | 12 |
| PRINTING SURFACE COUNT | 12 |
| PAGE LAYOUT | 1 |
| COLOR MODE | COLOR |
| PRINTING SIDE | SINGLE SIDE |
| TONER CONSUMPTION (Y) | 30 |
| TONER CONSUMPTION (M) | 34 |
| TONER CONSUMPTION (C) | 22 |
| TONER CONSUMPTION (K) | 124 |

PRINTING SYSTEM, IMAGE FORMING APPARATUS, DATA GENERATION APPARATUS, STORAGE APPARATUS, AND CONTROL METHOD

BACKGROUND OF THE INVENTION

1. Field of the Invention

The present invention relates to a printing system, image forming apparatus, data generation apparatus, storage apparatus, and control method.

2. Description of the Related Art

When handling confidential information, the information may be leaked to an unwanted third party by printing it by an image forming apparatus (device) such as a printer, facsimile apparatus, or copying machine. To cope with the information leak problem, image data printed by an image forming apparatus is stored. When confidential information leaks, matching with the stored image is done, and the leak route is specified from the associated information (printing date, and identification information of a printing user).

As one method for implementing this function, when a printer prints an image from a computer via a print server, the print server stores the print image (see Japanese Patent Laid-Open No. 2002-149371).

However, in the conventional technique, when the printer prints after changing print data acquired from the print server or the like, the stored data differs from the printed one. Even if the printed data is stored, no leak route can be specified upon information leak.

SUMMARY OF THE INVENTION

According to one aspect of the present invention, there is provided a printing system including: an application server which has a function of editing and storing document data, and provides the document data in response to a request; an image forming apparatus having a plurality of functions including a printing function; a data generation apparatus which generates, from the document data, print data printable by the image forming apparatus; and a storage apparatus which stores data having undergone processing by the image forming apparatus, the apparatuses being communicable with each other via a network, wherein the data generation apparatus comprises: generation unit configured to generate, from document data acquired from the application server in response to a request from the image forming apparatus, print data of a format printable by the image forming apparatus, the image forming apparatus comprises: recording unit configured to record, as difference data, a setting difference upon setting change of print data generated by the data generation apparatus; and transmission unit configured to, after executing processing for the print data, transmit a completion notification of the processing together with the difference data, and the storage apparatus comprises: storage unit configured store, in association with each other, at least one of the print data generated by the data generation apparatus and document data corresponding to the print data, and the difference data that corresponds to the print data and is recorded by the recording unit of the image forming apparatus.

According to another aspect of the present invention, there is provided an image forming apparatus which configures a printing system including: an application server which has a function of editing and storing document data, and provides the document data in response to a request; the image forming apparatus having a plurality of functions including a printing function; a data generation apparatus which generates, from the document data, print data printable by the image forming apparatus; and a storage apparatus which stores data having undergone processing by the image forming apparatus, the apparatuses being communicable with each other via a network, comprising: recording unit configured to record, as difference data, a setting difference upon setting change of print data; and transmission unit configured to execute processing for the print data, and transmitting a completion notification of the processing together with the difference data.

According to another aspect of the present invention, there is provided a data generation apparatus which configures a printing system including: an application server which has a function of editing and storing document data, and provides the document data in response to a request; an image forming apparatus having a plurality of functions including a printing function; the data generation apparatus which generates, from the document data, print data printable by the image forming apparatus; and a storage apparatus which stores data having undergone processing by the image forming apparatus, the apparatuses being communicable with each other via a network, comprising: generation unit configured to generate, from document data in response to a request from the image forming apparatus, print data of a format printable by the image forming apparatus.

According to another aspect of the present invention, there is provided a storage apparatus which configures a printing system including: an application server which has a function of editing and storing document data, and provides the document data in response to a request; an image forming apparatus having a plurality of functions including a printing function; a data generation apparatus which generates, from the document data, print data printable by the image forming apparatus; and the storage apparatus which stores data having undergone processing by the image forming apparatus, the apparatuses being communicable with each other via a network, comprising: storage unit configured to store, in association with each other, at least one of document data and print data obtained by converting the document data into a format printable by a predetermined image forming apparatus, and difference data serving as a setting difference upon setting change of the print data in printing.

According to another aspect of the present invention, there is provided a method of controlling a printing system including: an application server which has a function of editing and storing document data, and provides the document data in response to a request; an image forming apparatus having a plurality of functions including a printing function; a data generation apparatus which generates, from the document data, print data printable by the image forming apparatus; and a storage apparatus which stores data having undergone processing by the image forming apparatus, the apparatuses being communicable with each other via a network, wherein the data generation apparatus comprises: a generation step of causing generation unit to generate, from document data acquired from the application server in response to a request from the image forming apparatus, print data of a format printable by the image forming apparatus, the image forming apparatus comprises: a recording step of causing recording unit to record, as difference data, a setting difference upon setting change of print data generated by the data generation apparatus; and a transmission step of causing transmission unit to, after executing processing for the print data, transmit a completion notification of the processing together with the difference data, and the storage apparatus comprises: a storage step of causing storage unit to store, in association with each other, at least one of the print data generated by the data generation apparatus and document data corresponding to the print data, and the difference data that corresponds to the print data and is recorded in the recording step of the image forming apparatus.

The present invention can more accurately store data printed by an image forming apparatus, improving security.

Further features of the present invention will become apparent from the following description of exemplary embodiments (with reference to the attached drawings).

DESCRIPTION OF THE EMBODIMENTS

First Embodiment

[Hardware Configuration]

Figure 1:
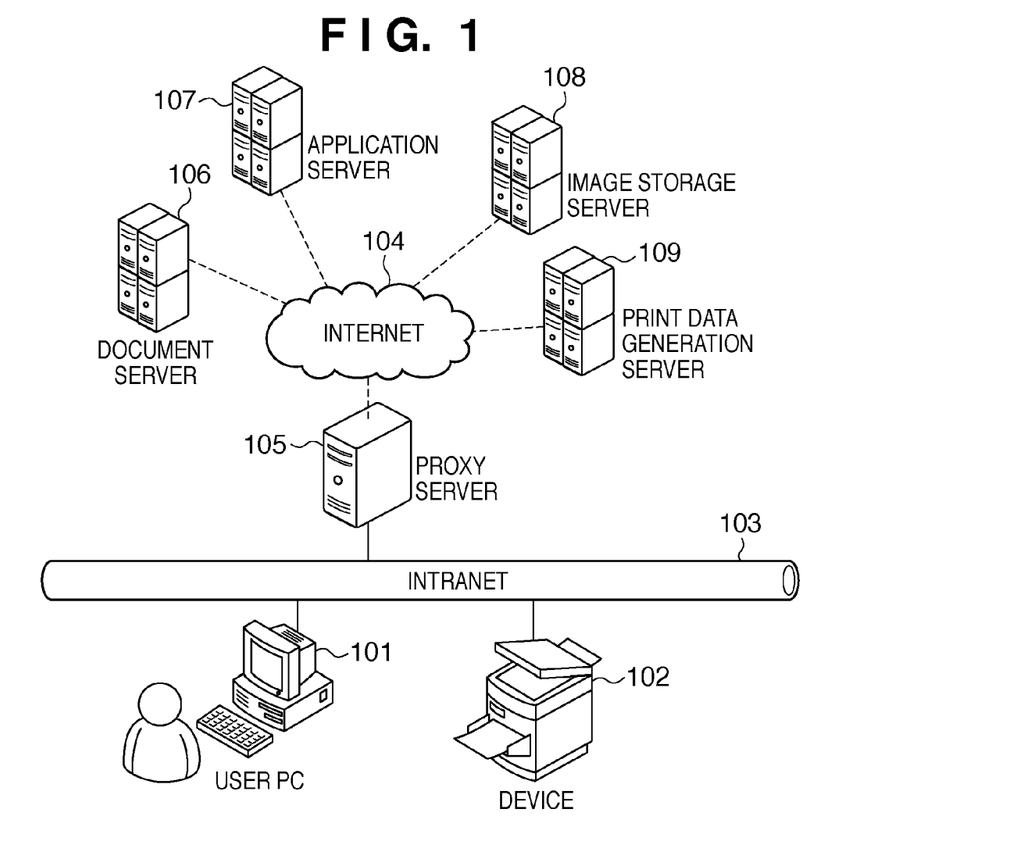
FIG. 1 is a view showing the arrangement of building components on a network.

The first embodiment of the present invention will now be described with reference to the accompanying drawings. FIG. 1 is a view for explaining the overall configuration of a printing system according to the embodiment. A user PC (Personal Computer) 101 is operated by the user. A device 102 is an image forming apparatus. Nodes connected to an intranet 103 can communicate with each other in two ways. A node on the side of the intranet 103 can be connected to Internet 104 via a Proxy server 105. The Proxy server 105 has a function of preventing establishment of connection from a node on the side of the Internet 104 to a network on the side of the intranet 103. A document server 106 stores various document data, and provides stored document data in response to a request. An application server 107 provides services of editing and printing document data stored in the document server 106. An image storage server 108 serving as a storage apparatus stores image data of document data printed from the application server 107. A print data generation server 109 serving as a data generation apparatus generates, based on document data, print data of a format printable by a printing apparatus (for example, the device 102). Note that the apparatuses on the side of the Internet 104 can also communicate with each other.

A sequence of editing and printing document data in the system having these building components will be explained. A browser 702 runs on the user PC 101 and allows an interactive operation with the application server 107. The user of the user PC 101 logs in to the application server 107. Note that the respective servers require login processing, but a description thereof will be omitted. When the user PC 101 instructs the application server 107 to expand document data in the document server 106, the application server 107 acquires the document data from the document server 106, and sends back, to the user PC 101, a UI (User Interface) capable of editing the document data. After the end of necessary editing by the user, the user PC 101 instructs the application server 107 to store the document data.

Upon receiving the storage instruction, the application server 107 stores the document data in the document server 106. When printing document data, the user can designate a print data generation server to be used on the Internet 104, and store, in the document data, information indicating the print data generation server. The user can acquire, from the application server 107, a URL (Uniform Resource Locator) for designating printing of the document data. Note that apparatuses on the side of the Internet 104 are different servers corresponding to respective roles to clarify the functions of the apparatuses, but a single apparatus may have all the functions.

Figure 2:
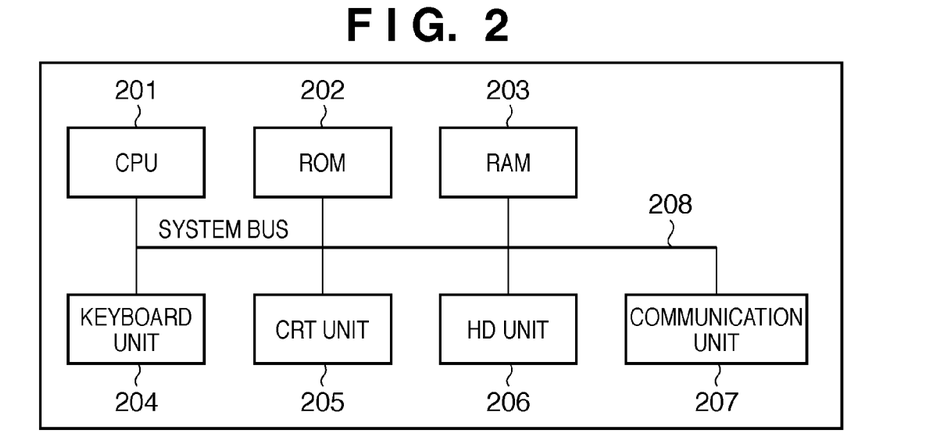
FIG. 2 is a block diagram showing the arrangement of an administrator PC or file server.

FIG. 2 is a block diagram showing a computer serving as the building component in FIG. 1. The user PC 101, Proxy server 105, document server 106, application server 107, image storage server 108, and print data generation server 109 have an internal arrangement as shown in FIG. 2. Generally in a server, components such as an HDD take a redundant arrangement to avoid a fault. The redundant arrangement includes two or more components having the same function. Even if one component fails, the other operates to guarantee a continuous operation.

Referring to FIG. 2, a CPU (Central Processing Unit) 201 performs control of the overall computer apparatus, calculation processing, and the like. A ROM (Read Only Memory) 202 is a storage area for system boot program information and the like. A RAM (Random Access Memory) 203 is a data storage area free from any use restriction, and is an area where programs such as an operating system (OS), application, device driver, and communication control program are loaded and executed. A keyboard unit 204 receives data input from a keyboard (not shown) and transfers it to the CPU 201.

A CRT unit 205 is a display control unit which controls display on a display device. An HD unit 206 is an external storage device such as an FD (Floppy® Disk), HD (Hard Disk), or SRAM (nonvolatile storage device). The HD unit 206 stores programs and data. If necessary, the stored data is referred to or loaded into the RAM 203 in execution. A communication unit 207 performs network communication control, and can communicate with another computer or peripheral device connected to a network, as described with reference to FIG. 1. A system bus 208 serves as a data path between the above-described building components.

Figure 3:
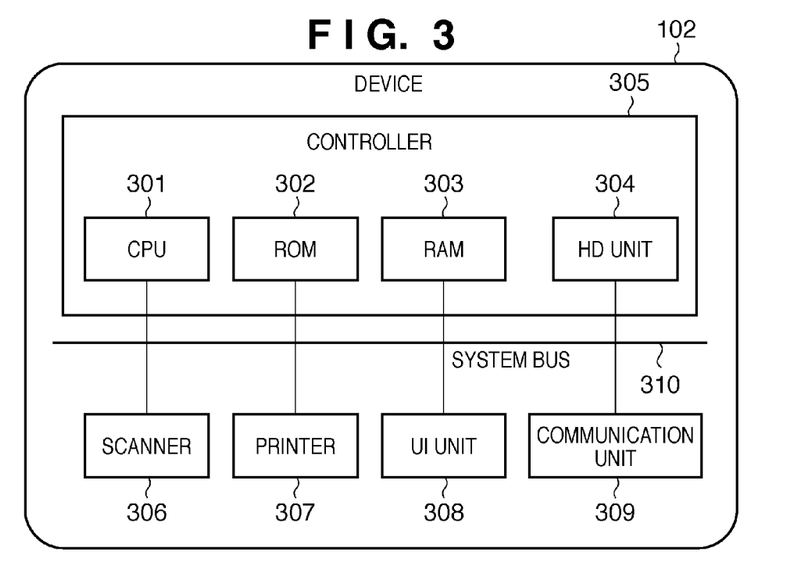
FIG. 3 is a block diagram showing the arrangement of a device.

FIG. 3 is a block diagram of the device 102. When the device has a plurality of functions such as copying, printing, and scanning functions, it is also called an MFP (MultiFunction Peripheral). The device 102 represents the whole device. A controller 305 controls the overall device 102. The controller 305 incorporates a CPU 301 which performs control of the controller 305, calculation processing, and the like. A ROM 302 is a storage area for system boot program information and the like. A RAM 303 is a data storage area free from any use restriction. An HD unit 304 is a nonvolatile storage device such as an HD (Hard Disk) or SRAM.

The RAM 303 is an area where programs such as an OS, communication control program, and engine control program are loaded and executed, or data are stored. A scanner 306 performs an image reading operation. A printer 307 performs a printing operation under the control of the controller. A UI unit 308 accepts an instruction from the user or provides a display. A communication unit 309 performs network communication control, and allows communication with another device or computer. A system bus 310 serves as a data path between the above-described building components.

[Software Configuration]

Figure 4:
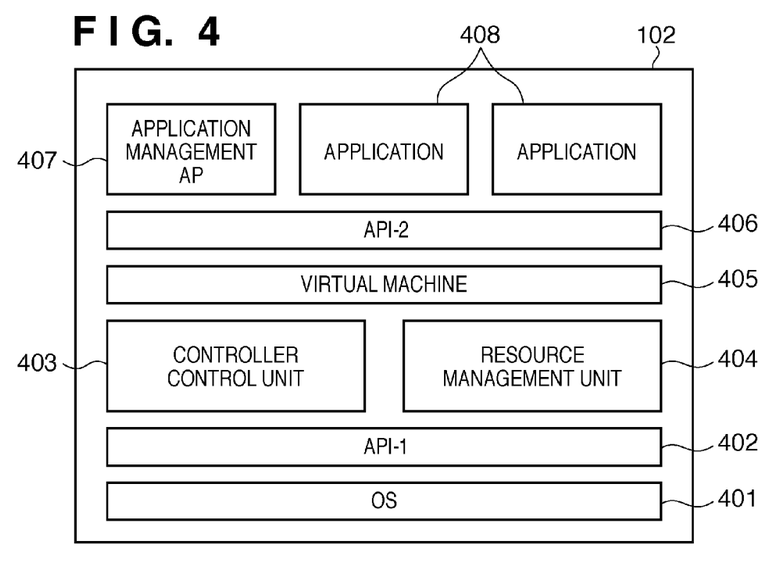
FIG. 4 is a block diagram showing the software configuration of the device.

FIG. 4 is a block diagram showing the software configuration of the device 102 according to the embodiment. This software is stored in the ROM 302 or HD unit 304, and when the device is activated, loaded into the RAM 303 and executed. An OS 401 manages/controls the resources of the whole device. An API-1 402 is an interface for an application running on the OS 401. Through the API-1 402, an application can access a device resource or execute a command using the CPU.

A controller control unit 403 runs on the OS 401, and controls the scanner 306, printer 307, UI unit 308, and the like. A resource management unit 404 restricts the use of more than predetermined resources when the controller control unit 403, a virtual machine 405 (to be described later), and all applications on the virtual machine 405 are to use resources such as the memory. The virtual machine 405 is an execution environment for executing a specific application. The virtual machine 405 is implemented by, for example, a Java® virtual machine.

An API-2 406 is an interface which allows an application running on the virtual machine 405 to use the controller control unit 403, resource management unit 404, API-1 402, and the like. An application management application 407 manages an application running on the virtual machine 405. The application management application 407 performs download, upload, deletion, and invalidation of an application, which will be described later. An application 408 is one of applications running on the virtual machine 405. An arbitrary number of applications having arbitrary functions can be installed and operated in accordance with roles expected of the device. Even a monitoring program can operate as the application 408.

[Processing Sequence]

Figure 5A:
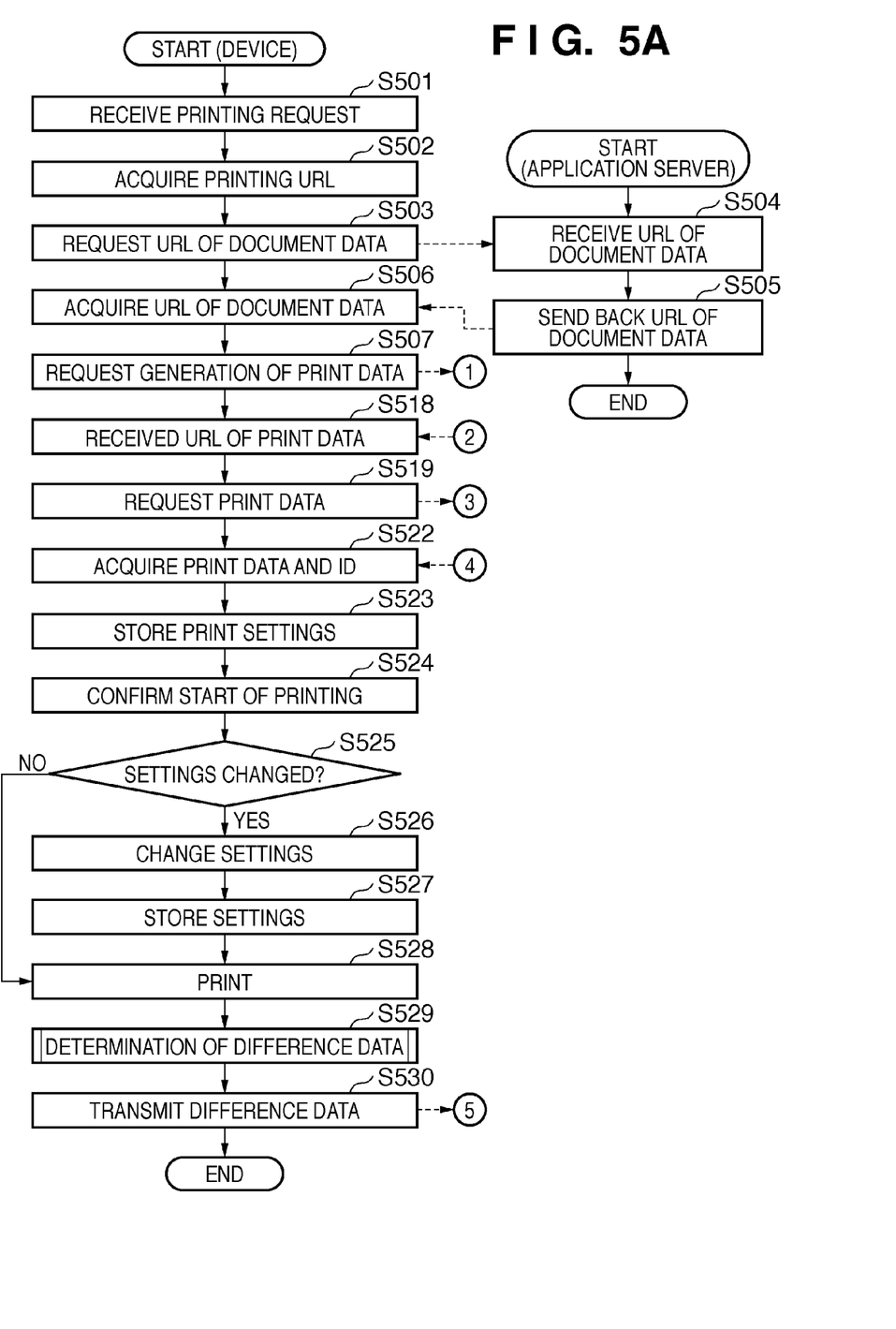
FIGS. 5A and 5B are flowcharts showing the operation of an overall system.
Figure 5B:
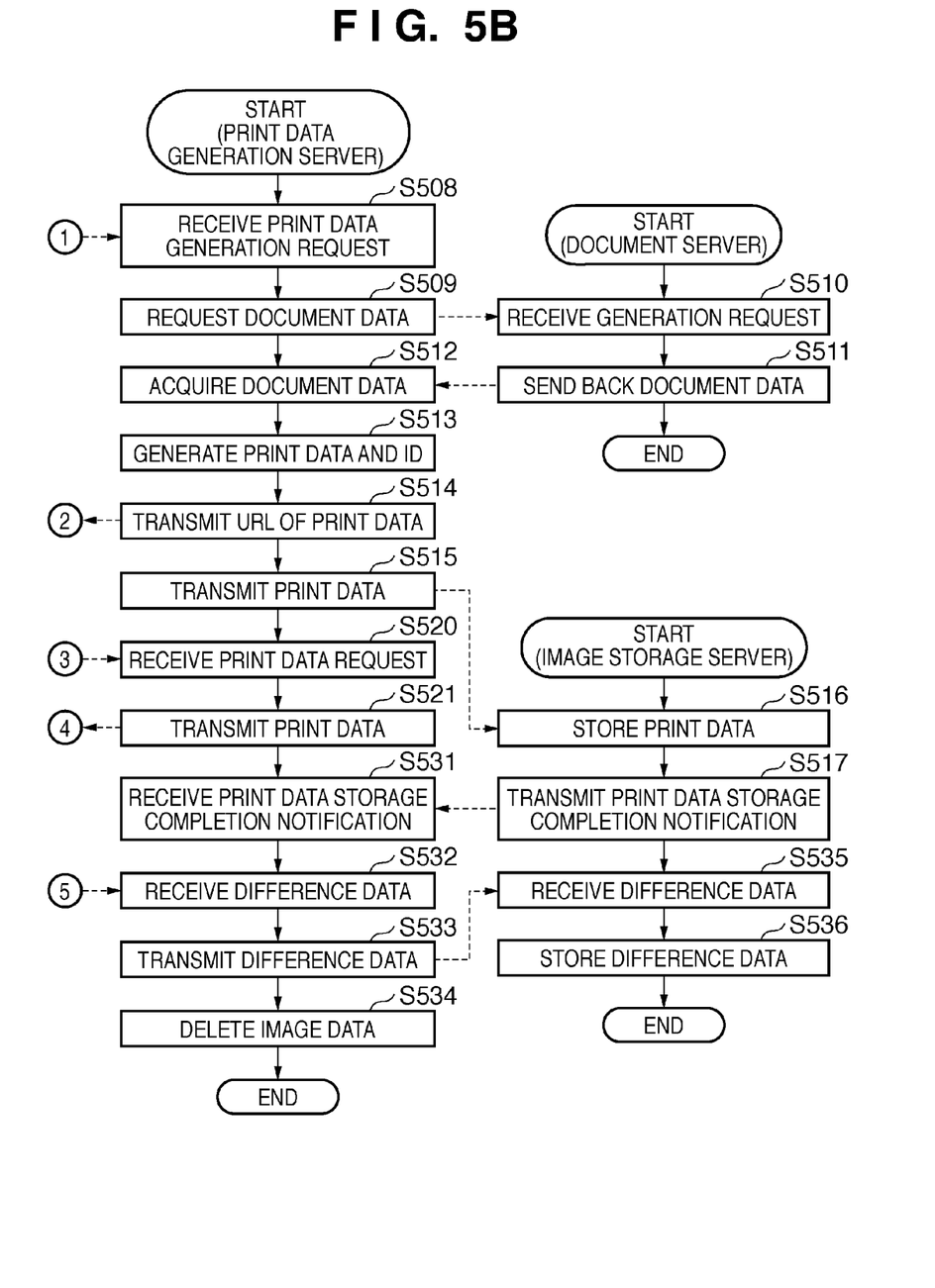

Processing by the printing system in the embodiment will be explained with reference to the flowcharts of FIGS. 5A and 5B. In the flowcharts of FIGS. 5A and 5B, solid lines indicate a processing sequence in the main processor (apparatus) of each processing, and broken lines indicate a data flow between the apparatuses. Nodes on the network shown in FIG. 1 can exchange information using a web service. The web service allows the use of a software function via a network using the WWW (World Wide Web) technique. An implementation is XML (eXtensible Markup Language)/SOAP (Simple Object Access Protocol).

An example of a UI (User Interface) used during processing will be described. FIGS. 6A to 6D show the UI of a printing application 705 running on the device 102. By designating a specific URL, the user can instruct the device 102 to print document data on the Internet 104. The URL can be acquired from the UI (provided on the browser) of the application server 107. In the embodiment, data obtained by converting document data into a format printable by a predetermined image forming apparatus (for example, the device 102) will be called print data.

Figure 7:
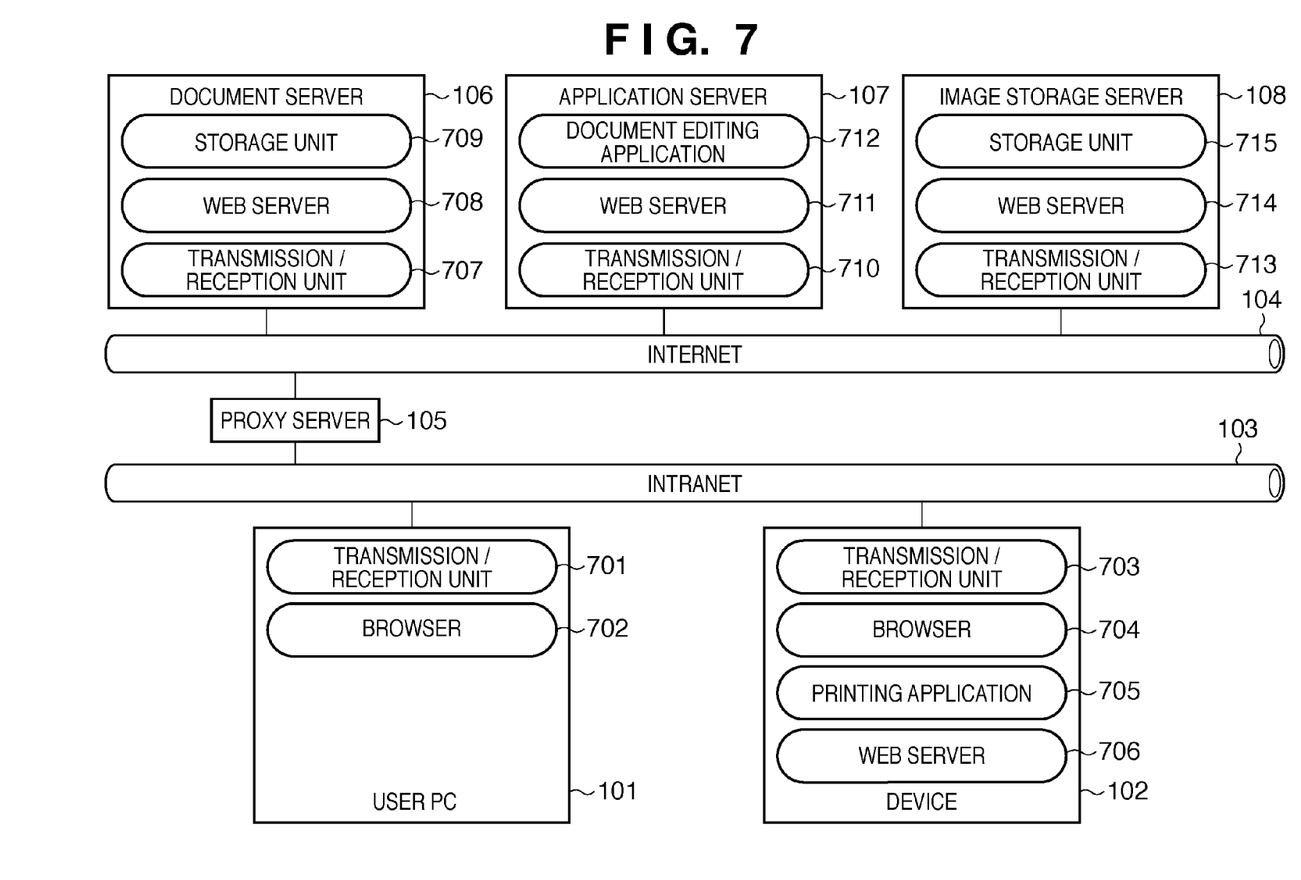
FIG. 7 is a block diagram showing the blocks of the building components.

FIG. 7 is a block diagram showing the software configuration of each device shown in FIG. 1. The user PC 101 includes a transmission/reception unit 701 which transmits/receives data to/from the network, and a browser 702. The device 102 includes a transmission/reception unit 703 which receives data via the network, the printing application 705, a browser 704, and a web server 706. The document server 106 includes a transmission/reception unit 707 which transmits/receives data via the network, a web server 708, and a storage unit 709 which stores document data. The application server 107 includes a transmission/reception unit 710 which transmits/receives data via the network, a document editing application 712 which edits document data, and a web server 711 which performs HTTP communication. The image storage server 108 includes a transmission/reception unit 713 which transmits/receives data via the network, a web server 714, and a storage unit 715 which stores document data.

Figure 6A:
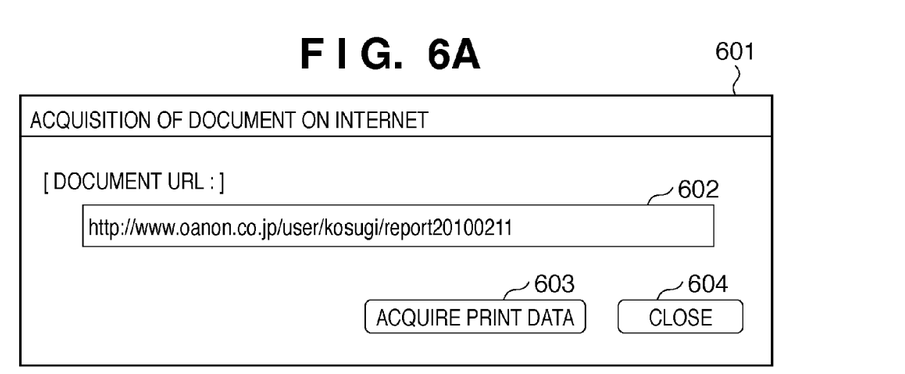
FIGS. 6A, 6B, 6C, and 6D are views each exemplifying the UI of an application running on the device.

If the user presses a print data acquisition button 603 on the dialog of FIG. 6A, the printing application 705 in the device accepts a printing request in step S501. The device 102 acquires a URL designated by the user in step S502, and requests the URL of document data of the application server 107 in step S503. In step S504, the application server 107 accepts the document data request from the device 102. In step S505, the application server 107 sends back, to the device 102, a URL which specifies the document data, and the URL of the print data generation server 109 for converting the document data into print data of a format printable by the device 102.

In step S506, the device 102 acquires the URL of the document data. In step S507, the device 102 issues a print data generation request to the print data generation server 109 to convert the designated document data into print data of a printable format. At this time, the device 102 sends the URL of the document data to the print data generation server 109.

In step S508, the print data generation server 109 receives the print data generation request. At the same time, the print data generation server 109 receives the URL of the document data. In step S509, the print data generation server 109 requests the document data of the document server 106 based on the URL of the received document data. In step S510, the document server 106 receives the document data request from the print data generation server 109. In step S511, the document server 106 sends back the document data in response to the document data request from the print data generation server 109. In step S512, the print data generation server 109 receives the document data transmitted from the document server 106.

In step S513, the print data generation server 109 generates print data. At the same time, the print data generation server 109 generates a data ID (identifier) for uniquely specifying the print data. An example of the data ID is UUID (Universally Unique Identifier [RFC 4122]). In step S514, after the end of generating the print data, the print data generation server 109 stores the print data and transmits, to the device 102, a URL at which the data can be accessed. In step S515, the print data generation server 109 transmits the print data to the image storage server 108. This print data contains even the above-mentioned data ID.

In step S516, the image storage server 108 stores the print data. In step S517, upon completion of storing the print data, the image storage server 108 notifies the print data generation server 109 of a message to this effect.

In step S518, the device 102 acquires the URL of the print data that has been transmitted from the print data generation server 109 in step S514. In step S519, the device 102 requests the data of the print data generation server 109 based on the acquired URL.

In step S520, the print data generation server 109 receives the data request from the device 102. In step S521, the print data generation server 109 transmits the print data to the device 102. The print data contains even the above-mentioned data ID. In step S522, the device 102 acquires the print data transmitted from the print data generation server 109. In step S523, the device 102 stores the print settings of the acquired print data. The print settings indicate conditions when printing print data. Examples of the print settings are the color, layout, page number printing, whether to embed a copy-forgery-inhibited pattern, paper size, paper type, copy count, layout order, page frame, whether to print the printing date & time, detailed color information (for example, color saturation, screen for use, and contrast), form composition, stapling, and punching. Note that the print settings are not limited to these items, and an item necessary for, for example, a function provided by the device 102 can be set.

Figure 6B:
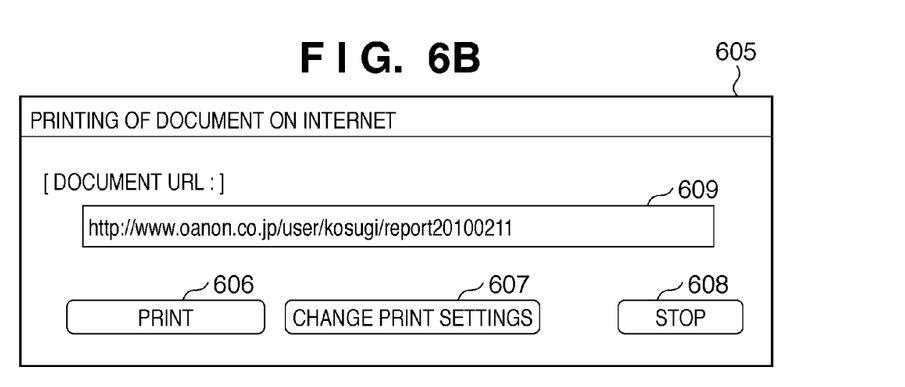
Figure 6C:
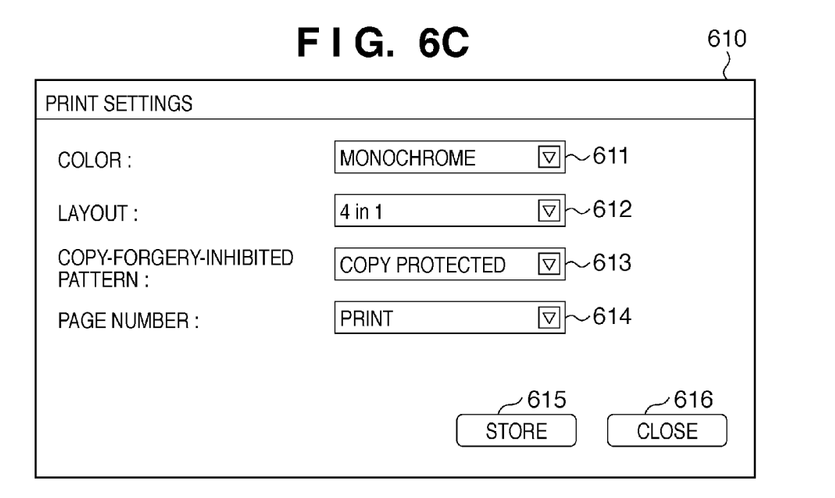

In step S524, the device 102 outputs a dialog representing that printing is to start, as shown in FIG. 6B. This dialog has buttons such as "print" and "change print settings". In step S525, the device 102 determines whether the user has pressed "change print settings" in the dialog. If the user has pressed not "change print settings" but a print button 606 in the dialog (NO in step S525), the process advances to step S528. If the user has pressed "change print settings" (YES in step S525), the device 102 displays a dialog as shown in FIG. 6C for setting in step S526. The user can designate, through the UI, a change of print settings such as the printing color (monochrome/color) and page layout. Note that the dialog shown in FIG. 6C is merely an example. In practice, other print setting items exist, as described above, and still other items may be displayed.

If the user presses a store button 615 in FIG. 6C, the device 102 determines that the change of settings is completed, and stores the print settings in step S527. If the user presses the print button 606, the device 102 executes printing in step S528. In step S529, the device 102 determines difference data to be sent back to the print data generation server 109. The difference data determination method will be described later with reference to FIG. 8.

In step S530, the device 102 transmits the difference data to the print data generation server 109. In step S531, the print data generation server 109 receives the data storage completion notification from the image storage server 108. In step S532, the print data generation server 109 receives the difference data which has been transmitted from the device 102 in step S530. In step S533, the print data generation server 109 transmits the difference data to the image storage server 108. In step S534, the print data generation server 109 deletes the image data.

In step S535, the image storage server 108 receives the difference data transmitted from the print data generation server 109. In step S536, the image storage server 108 stores the original data stored in step S516 and the difference data received in step S535 in association with each other. At this time, the data ID generated in step S513 is used as an association key.

[Dialog]

FIG. 6A is a view exemplifying the UI of an application running on the device 102. A dialog 601 is used to acquire document data on the Internet 104. A text box 602 allows designating the URL of a document to be printed. When the user presses the print data acquisition button 603, acquisition of data starts. A close button 604 is used to close the dialog 601.

FIG. 6B is a view exemplifying the UI of an application running on the device 102. When the user presses the print data acquisition button 603 shown in FIG. 6A and acquisition of print data is completed, the dialog in FIG. 6B is output. A dialog 605 contains a text box 609 indicating the URL of the acquired data. When the user presses the print button 606, printing starts. When the user presses a print setting change button 607, a dialog for changing print settings appears. When the user presses a stop key 608, the application ends.

FIG. 6C is a view exemplifying the UI of the printing application 705 running on the device 102. When the user presses the print setting change button 607, a dialog 610 appears. A combo box 611 is used to designate a color setting, and allows selecting color/monochrome. When the user selects monochrome, even received data containing color information is printed in monochrome. A combo box 612 is used to designate a layout, and allows selecting 2in1, 6in1, 8in1, booklet printing, or the like. A combo box 613 is used to designate a copy-forgery-inhibited pattern, and allows selecting "copy protected"/"confidential" or inputting an arbitrary character string. A combo box 614 is used to designate whether to print a page number, and allows selecting whether or not to print it. The store button 615 is used to store print settings currently selected by the user. When the user presses a close button 616, the dialog 610 disappears.

Figure 6D:
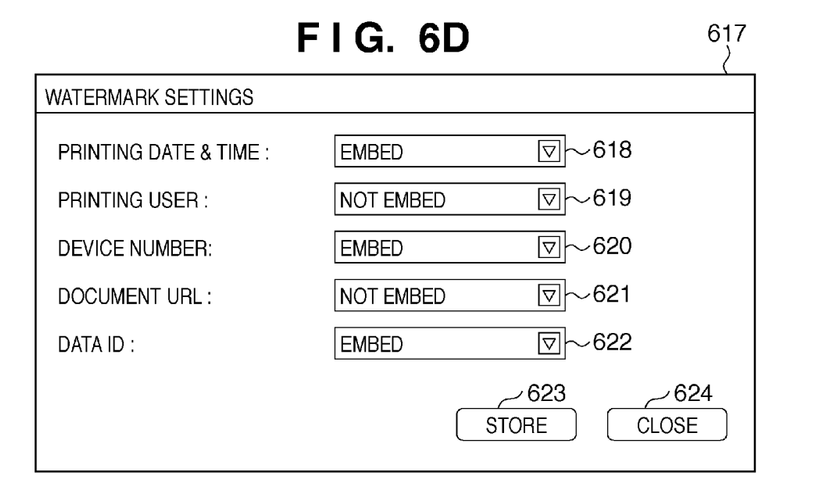

FIG. 6D shows a UI for making a watermark setting in the device 102. A dialog 617 appears when setting a watermark. A combo box 618 is used to designate whether or not to embed the printing date & time as watermark information. Similarly, combo boxes 619, 620, 621, and 622 allow designating whether or not to embed a printing user, device number, document URL, and data ID (issued in step S513), respectively.

[Difference Data Determination Processing]

Figure 8:
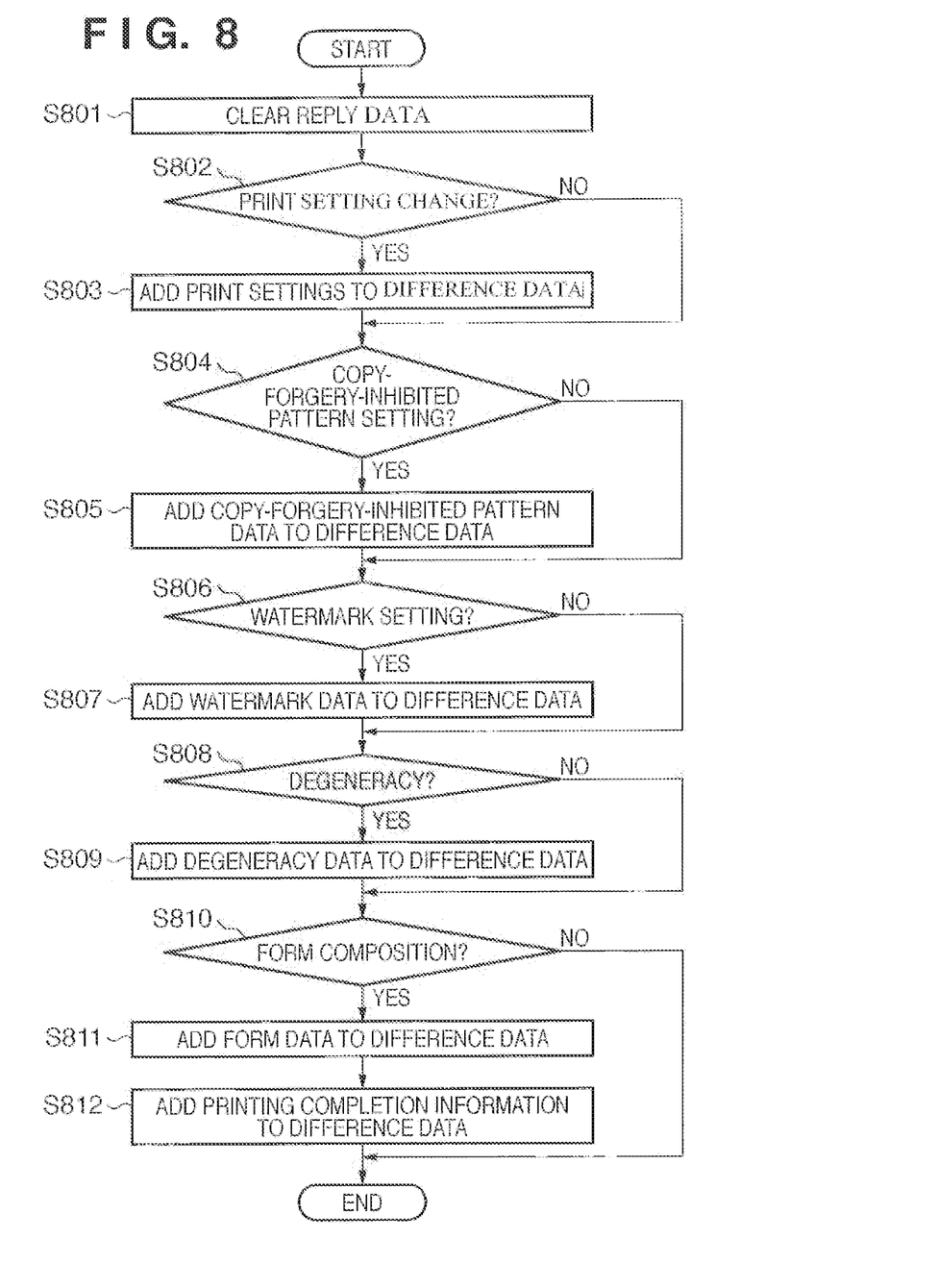
FIG. 8 is a flowchart showing determination of information to be sent back by the device.

Processing shown in FIG. 8 is a sequence representing processing of determining difference data by the device 102 in step S529 of FIG. 5A. In step S801, the device 102 clears reply data. The difference data is a list of a text, image, and another arbitrary binary data. In step S802, the device 102 determines whether the print settings of print data have changed. If the print settings have changed (YES in step S802), the device 102 adds the print settings to the difference data in step S803. If no print setting has changed (NO in step S802), the device 102 directly advances to step S804.

In step S804, the device 102 determines whether a copy-forgery-inhibited pattern has been set in the print data. If a copy-forgery-inhibited pattern has been set (YES in step S804), the device 102 adds the copy-forgery-inhibited pattern setting to the difference data in step S805. If no copy-forgery-inhibited pattern has been set (NO in step S804), the device 102 advances to step S806. In step S806, the device 102 determines whether a watermark has been set in the print data. If a watermark has been set (YES in step S806), the device 102 adds the watermark setting to the difference data in step S807. If no watermark has been set (NO in step S806), the device 102 directly advances to step S808.

In step S808, the device 102 determines whether the print data has degenerated. If the print data has degenerated (YES in step S808), the device 102 adds degeneracy information to the difference data in step S809. "Degeneracy" indicates that a function originally provided to the device cannot achieve originally intended printing owing to a device failure, shortage of a printing resource such as toner, or the like. If the print data has not degenerated (NO in step S808), the device 102 directly advances to step S810.

Figure 10:
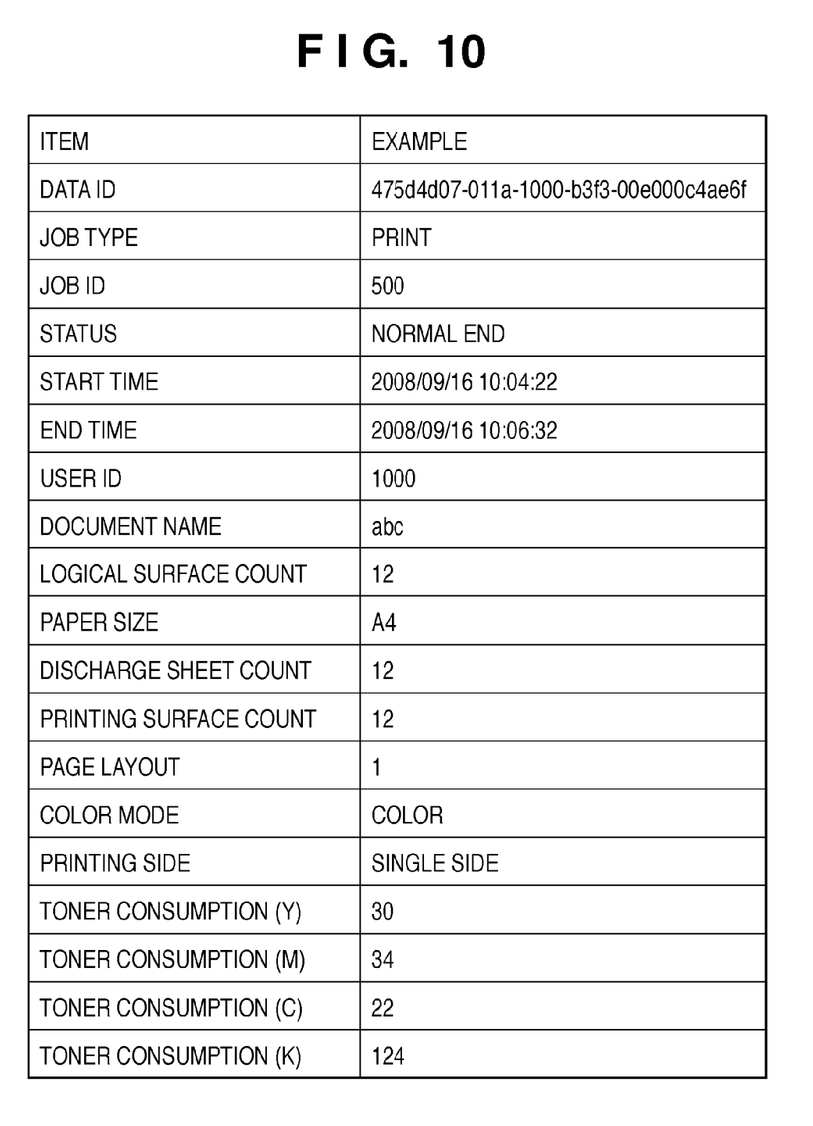
FIG. 10 is a table exemplifying printing completion information.

In step S810, the device 102 determines whether a form has been composited to the print data. If a form has been composited (YES in step S810), the device 102 adds the form information to the difference data in step S811. In step S812, the device 102 adds printing completion information to the difference data. The printing completion information indicates the end status, print page count, print sheet count, and toner consumption in the job. If no form has been composited to the print data (NO in step S810), the device 102 ends the process sequence. FIG. 10 exemplifies the printing completion information. In the embodiment, the printing completion information is transmitted together with the difference data in step S530 of FIG. 5A. Note that the printing completion information is not limited to items shown in FIG. 10. Information managed for print data may be further added or deleted, as needed.

In the above-described "copy-forgery-inhibited pattern", a special pattern which appears as a character or image upon copying is printed on the background. The copy-forgery-inhibited pattern is effective when preventing illicit use of securities, a certificate, or the like by copying. The copy-forgery-inhibited pattern is formed from two regions having the same density, that is, a region where dots remain after copying and a region where dots disappear after copying. These two regions are almost equal in density, and have microscopically different characteristics though a hidden character or image such as "copy" is not recognized at a glance macroscopically.

The above-described "watermark" invisibly embeds access control information in a printed material. As a general implementation method, there are proposed a watermark which embeds information by controlling the space of an alphabetical character string, one which rotates a character, one which scales a character, and one which embeds information by deforming a character.

The above-described "form composition" indicates that a form image registered in advance and the image of an input job are composited for each page and output. The determination is made based on form composition information indicating whether form composition has been done.

[Document Editing Application]

Figure 9:
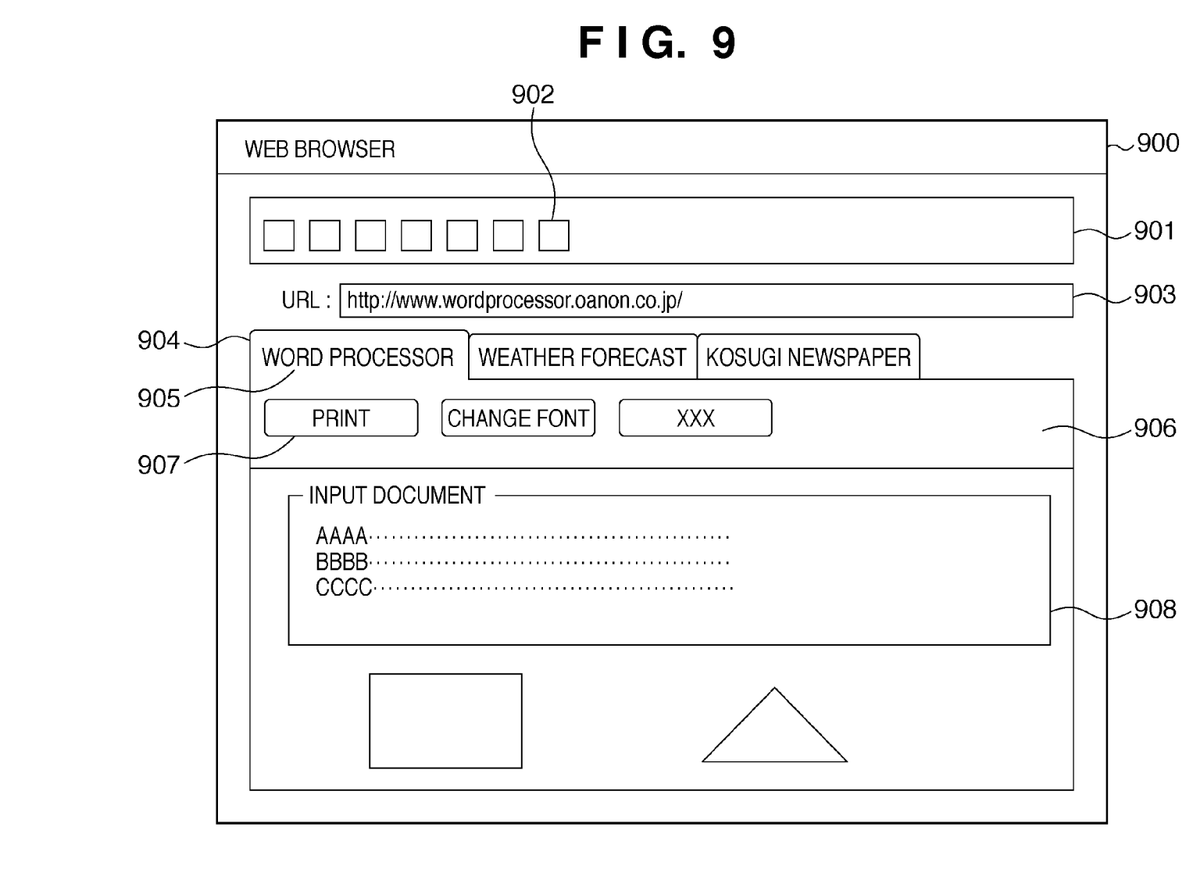
FIG. 9 is a view exemplifying an application running on a browser.

FIG. 9 exemplifies the UI of the document editing application 712 running on the browser 702 of the user PC 101. An application window 900 is a display example of the document editing application. A toolbar 901 is used when a window-based application accepts a command. Buttons 902 are used to designate a command. Since this application is a web browser, the buttons 902 include those for reload, stop, jump to a home page, and the like, details of which will be omitted. A text box 903 is used to designate a URL. When the user inputs a URL text and presses the Enter key of the keyboard (not shown), a display region 904 displays the contents of the URL. In the embodiment, the URL designates a word processor application. A tag 905 exhibits the title of a page designated by the URL. On a toolbar 906, buttons for designating a command are arranged. When the user presses a print button 907, the printing application 705 starts up, and the dialog 601 appears. At this time, a URL for printing the current document is input in the text box 602. A region 908 displays document data during editing by WYSIWYG (What You See Is What You Get). WYSIWYG indicates that the screen display is identical to a printout.

The processing and display in the first embodiment have been described. The first embodiment can manage change of settings of data printed by the device and more accurately store output data, improving security in information management. More specifically, the print data generation server stores print data to be transmitted. After the end of printing, the print data-receiving side sends back the completion notification, and difference information between the received print data and the output data. As a result, the data transfer amount can be decreased, printed data can be recorded more accurately, and traceability upon information leak can be improved.

Second Embodiment

In the first embodiment, text information of printed image data is not stored, so it is difficult to search for the printed image data using character string information. It is generally conceivable to extract a text using print data. However, no high extraction precision (character recognition rate) may be obtained.

This problem is solved by changing the flowcharts of FIGS. 5A and 5B. When transmitting print data to an image storage server 108, document data acquired in step S512 in correspondence with the print data is also transmitted in step S515 and stored in step S516.

By storing both document data and print data, both text information and image information can be used to specify, from leaked information, a printing user.

Third Embodiment

In the second embodiment, if the data storage cost is high, when storing document data and print data in step S516, these data may be compared to store data of a smaller amount.

In addition to the effects of the second embodiment, a capacity necessary to store data can be reduced, exploiting the resource.

Fourth Embodiment

In the flowchart of FIG. 5B, document data is requested in step S509. At this time, authentication information may be required for access restriction. The necessity of authentication information indicates that document data is confidential. By paying attention to this, it is considered that document data which does not require authentication information need not be stored in an image storage server 108. For this reason, a step of determining whether authentication information is necessary may be added to the flowcharts of FIGS. 5A and 5B. If no authentication information is necessary, the storage processes in steps S516 and S536 can be skipped.

In this manner, the necessity of storing data is determined based on the presence/absence of document data access control, and data is stored for only document data which requires access control. In addition to the effects of the first embodiment, the resource can be exploited.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-123301, filed May 28, 2010, which is hereby incorporated by reference herein in its entirety.

What is claimed is:

1. A printing system including:
    an image forming apparatus having a printing function;
    a data generation apparatus which generates, from document data serving as a print target, print data printable by the image forming apparatus; and a storage apparatus which stores data about print data to be processed by the image forming apparatus, wherein the image forming apparatus, the data generation apparatus, and the storage apparatus are communicable with each other via a network, wherein the data generation apparatus comprises:
- a generation unit configured to generate, from document data as a print target, print data having a format printable by the image forming apparatus and generate an identifier for uniquely specifying the generated print data;
- an acquisition unit configured to acquire data for extracting text information included in the generated print data and
- a first sending unit configured to send data about the generated print data and the acquired data to the storage apparatus, wherein the data about the generated print data includes the generated identifier, wherein the image forming apparatus comprises:
- a recording unit configured to record, as difference data, a setting difference upon a setting change for print data performed when performing printing for the print data generated by the data generation apparatus, in a storage, wherein the setting change recorded as the difference data is a change about features or local data of the image forming apparatus, wherein the storage apparatus comprises:
- a storage unit configured to store, in association with each other, the data about the print data sent by the first sending unit, the acquired data and the difference data recorded by the recording unit by using the generated identifier.

2. The system according to claim 1, wherein the image forming apparatus further comprises:
- a second sending unit configured to send, to the data generation apparatus, a print completion notification and the difference data when performing printing for print data generated by the data generation apparatus,
- wherein the storage unit stores, in association with each other, the difference data received via the data generation apparatus and the data about the print data.

3. The system according to claim 1, wherein the storage unit further determines, based on presence/absence of access restriction to the document data, whether to store the print data.

4. The system according to claim 1, wherein the difference data includes at least one of, a copy-forgery-inhibited pattern setting, watermark information, degeneracy information, and form composition information.

5. A data generation apparatus which is communicable with a storage apparatus which stores data about print data to be processed by an image forming apparatus, comprising:
- a generation unit configured to generate, from document data serving as a print target, print data having a format printable by the image forming apparatus and generate an identifier for uniquely specifying the generated print data,
- an acquisition unit configured to acquire data for extracting text information included in the generated print data,
- a sending unit configured to send data about the generated print data and the acquired data to the storage apparatus, wherein the data about the generated print data includes the generated identifier, and
- a receiving unit configured to receive, from the image forming apparatus, a print completion notification and difference data indicating a difference by a change of setting performed when performing printing for the generated print data in the image forming apparatus, wherein the difference data is a change about features or local data of the image forming apparatus,
- wherein the sending unit sends the difference data received from the image forming apparatus to the storage apparatus.

6. A method for controlling a printing system having an image forming apparatus having a printing function; a data generation apparatus which generates, from document data serving as a print target, print data printable by the image forming apparatus; and a storage apparatus which stores data about print data to be processed by the image forming apparatus, the image forming apparatus, the data generation apparatus, and the storage apparatus being communicable with each other via a network, said method comprising:
- in the data generation apparatus:
  - generating, from the document data serving as the print target, print data having a format printable by the image forming apparatus and generating an identifier for uniquely specifying the generated print data;
  - acquiring data for extracting text information included in the generated print data and
  - sending data about the generated print data and the acquired data to the storage apparatus, wherein the data about the generated print data includes the generated identifier,
- in the image forming apparatus:
  - recording, as difference data, a setting difference upon a setting change for print data performed when performing printing for the print data generated by the data generation apparatus, in a storage, wherein the setting change recorded as the difference data is a change about features or local data of the image forming apparatus; and
- in the storage apparatus:
  - storing, in association with each other, the data about the print data sent in the sending step, the acquired data and the difference data recorded in the recording step by using the generated identifier.

7. A method for controlling a data generation apparatus which is communicable with a storage apparatus which stores data about print data to be processed by an image forming apparatus, comprising:
- generating, from document data serving as a print target, print data having a format printable by the image forming apparatus and generating an identifier for uniquely specifying the generated print data,
- acquiring data for extracting text information included in the generated print data,
- sending data about the generated print data and the acquired data to the storage apparatus, wherein the data about the generated print data includes the generated identifier, and
- receiving, from the image forming apparatus, a print completion notification and difference data indicating a difference by a change of setting performed when performing printing for the generated print data in the image forming apparatus, wherein the difference data is a change about features or local data of the image forming apparatus,
- wherein the difference data received from the image forming apparatus is sent to the storage apparatus.

* * * * *